United States Patent [19]
Yonkers

[11] Patent Number: 5,230,722
[45] Date of Patent: Jul. 27, 1993

[54] VACUUM FILTER

[75] Inventor: Robert A. Yonkers, Grandville, Mich.

[73] Assignee: Amway Corporation, Ada, Mich.

[21] Appl. No.: 277,378

[22] Filed: Nov. 29, 1988

[51] Int. Cl.⁵ .............................................. B01D 50/00
[52] U.S. Cl. ...................................... 55/337; 55/473; 15/353
[58] Field of Search ........................... 55/337, 473, 353

[56] References Cited

U.S. PATENT DOCUMENTS

| | | | |
|---|---|---|---|
| 3,240,000 | 3/1966 | Hayes et al. | 55/337 |
| 3,308,609 | 3/1967 | McCulloch et al. | 55/337 |
| 3,716,967 | 2/1973 | O'Doyle et al. | 55/337 |

Primary Examiner—Bernard Nozick
Attorney, Agent, or Firm—Michael A. Mohr

[57] ABSTRACT

A final filter is provided for cleaning the cooling air drawn into the motor driven pump of a vacuum cleaner featuring a centrifugal separator. The final filter comprises a large area foam block filter and a sheet filter element received in a filter tray which is slideably received in a filter plenum disposed between the centrifugal separator and the motor/pump combination of the vacuum cleaner. The filter tray is supported horizontally within the filter plenum to define an inlet manifold and an outlet manifold having optimum flow characteristics and a detent is provided for snap locking the slideable filter tray within the filter plenum.

13 Claims, 4 Drawing Sheets

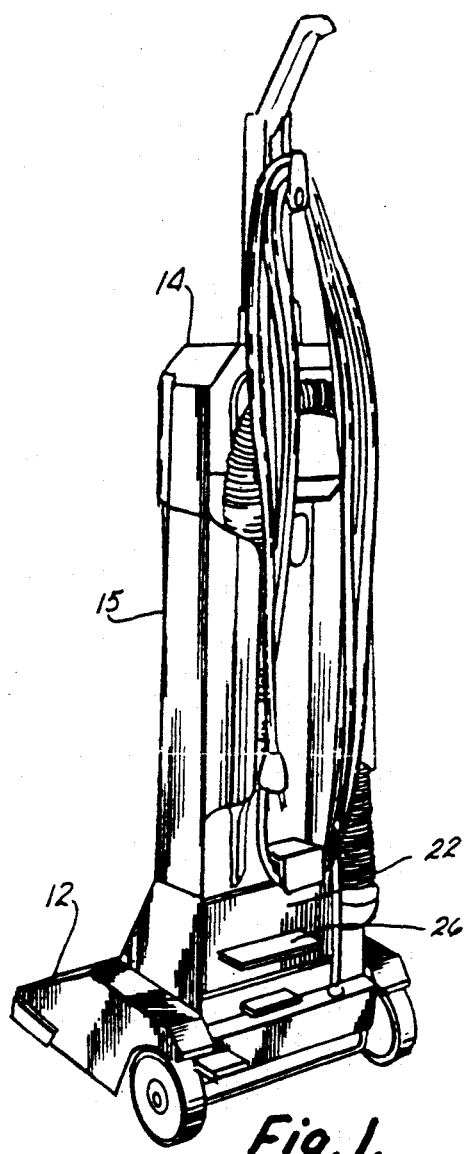
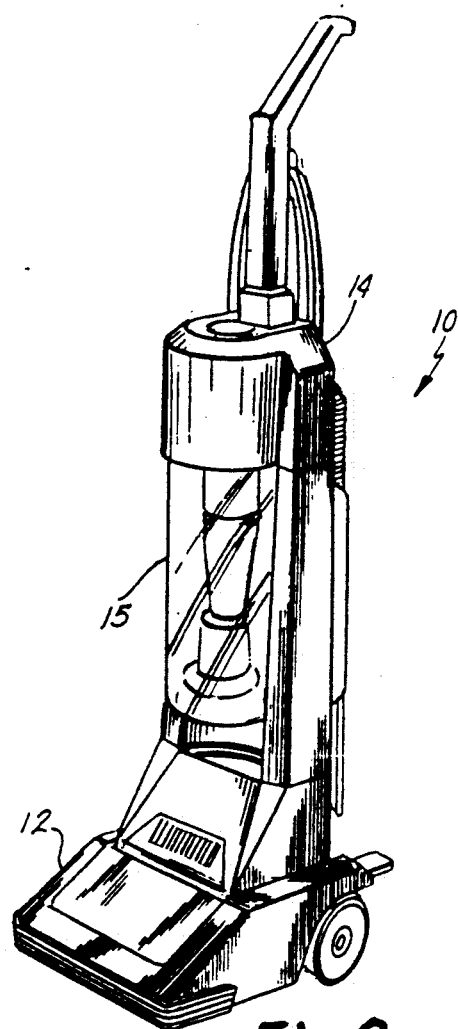
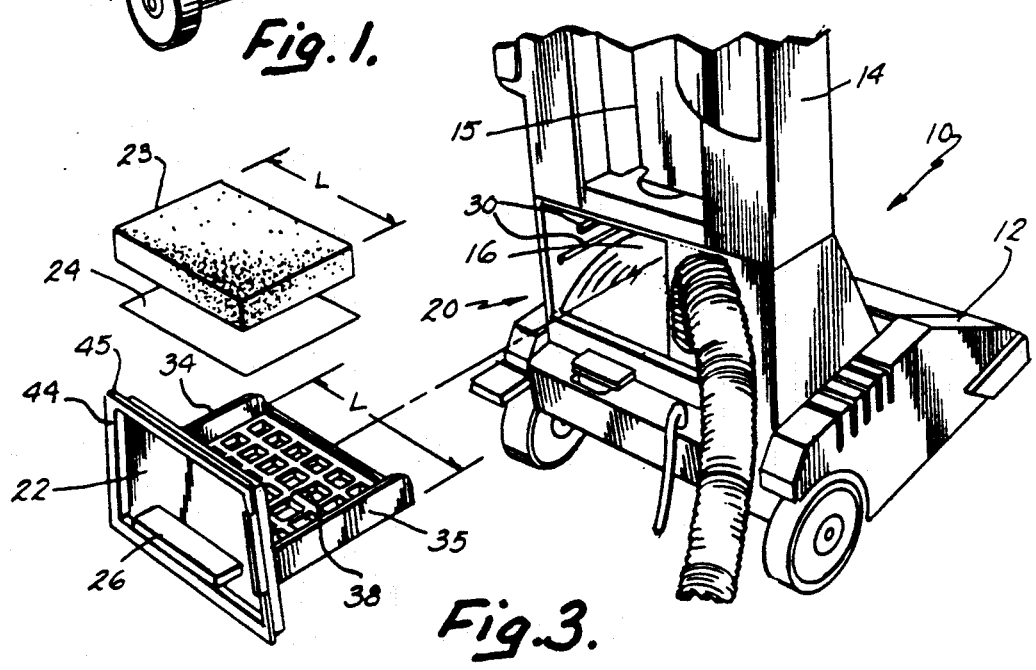
Fig. 1.
Fig. 2.
Fig. 3.

VACUUM FILTER

BACKGROUND OF THE INVENTION

The present invention relates generally to a filtering apparatus for removing lint and small debris from the air drawn through a vacuum cleaner. More particularly, the invention is directed to a final filter for cleaning the cooling air drawn into a motor driven pump of a vacuum cleaner featuring a centrifugal separator.

Vacuum cleaners of the type having a centrifugal separator normally use a motor driven pump to draw air, dirt and debris into the centrifugal separator which deposits particulate material entrained in the air into a receptacle. The air is then drawn from the centrifugal separator and forced through the motor by the pump downstream from the centrifugal separator for the purpose of cooling the motor. When full, the receptacle is removed, the debris dumped out, and the receptacle is replaced in the vacuum cleaner.

While vacuum cleaners featuring a centrifugal separator have certain advantages over those which feature a filter media, such as a filter bag, one disadvantage stems from the use of air discharged from the separator to cool the motor. Certain types of particulates tend to pass through the separator. These may include very fine particles or debris having a high lift-to-weight ratio, such as fine hair. These particles build up in the motor/pump combination and lead to long term reliability and maintenance problems with the vacuum cleaner.

SUMMARY OF THE INVENTION

According to the present invention, these and other problems in the prior art are solved by provision of a final filter within a plenum disposed between the pump and the centrifugal separator to remove fine particles and hair from the air used for cooling the motor. The filter is provided with a large filter area to prevent clogging, thereby reducing the frequency of filter maintenance, and to present as little flow resistance as possible, thereby preserving the efficiency of the centrifugal separator.

The final filter of the present invention comprises a large area foam block filter and a sheet filter element disposed in a drawer or filter tray. A filter plenum is provided which is disposed between the centrifugal separator and the motor/pump combination. A support structure is disposed within the filter plenum for slideably receiving the filter tray in a generally horizontal plane which bisects the filter plenum. The support means and the filter plenum thus define an inlet manifold disposed above the filter tray and an outlet manifold disposed below the filter tray. The filter tray is provided with an elongate shape, an air inlet for the inlet manifold being disposed on one end of the filter tray, and an air outlet for the exhaust or outlet manifold being disposed on the opposite side of the elongate tray for optimizing the flow characteristics of the filter plenum. The filter tray itself is formed from a lattice work defining an air permeable support surface for the filter elements. The lattice work is provided with a plurality of reliefs for balancing pressure below the filter elements. The filter plenum is further provided with a snap lock detent for engaging the slideable tray and retaining the same within the filter plenum. The filter tray is provided with a peripheral flange which receives an elastomeric seal for sealing the filter tray within the filter plenum.

The filter drawer assembly of the present invention provides several advantages: the filter elements are inexpensive and readily available; the foam filter element is reuseable and the HEPA filter element is disposable; the drawer can be formed of a rigid plastic material which is lightweight; the filter elements are easily accessible to the user; the filter elements are of a large area thereby preventing clogging; and the high efficiency of the combination of a foam filter and a HEPA filter results in particle free air cooling the motor without significantly adding to the load of the motor or detracting from the efficiency of the system.

BRIEF DESCRIPTION OF THE DRAWINGS

FIG. 1 is a front perspective of an upright vacuum cleaner featuring a centrifugal separator;

FIG. 2 is a rear perspective of an upright vacuum cleaner incorporating the final filter of the present invention;

FIG. 3 is an exploded assembly of the final filter of the present invention;

DESCRIPTION OF THE PREFERRED EMBODIMENT

Figure 6:
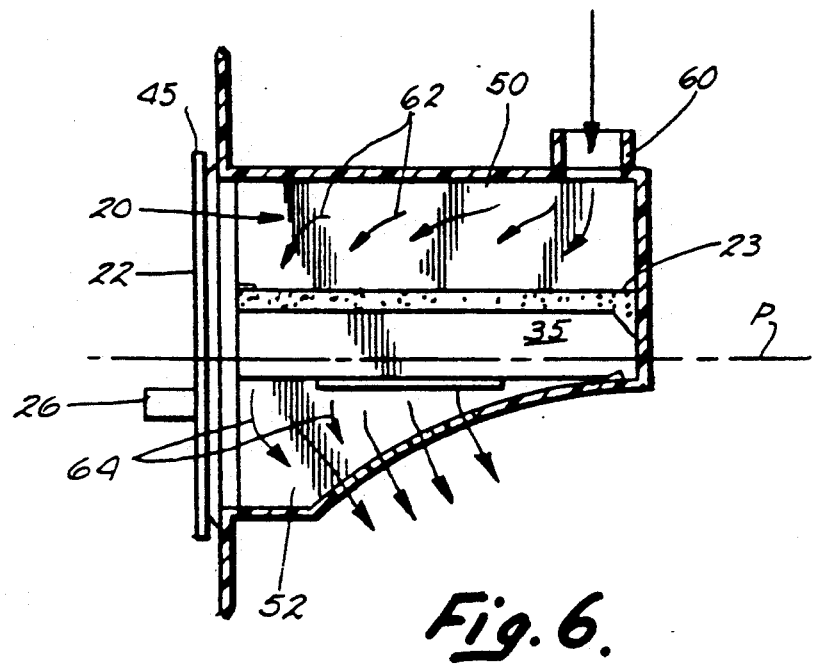
FIG. 6 is a fractional side elevation view partially in section of the filter plenum of the present invention with the filter tray disposed therein.

With reference now to the Figures, and in particular, to FIGS. 1, 2 and 3, an upright vacuum cleaner of the type featuring a centrifugal separator is generally illustrated at 10. The vacuum cleaner comprises a floor engaging working head 12 and an upright handle portion 14 including a centrifugal separator disposed at 15. The upright handle portion 14 is pivotal relative to the working head 12. A motor/pump combination is disposed within the vacuum cleaner at 16 for driving a beater bar, not illustrated herein. The beater bar is disposed on the underside of the working head 12. In the operation of the vacuum cleaner, air is drawn from a plenum surrounding the beater bar up into the centrifugal separator 15 and through the motor/pump combination 16. Most of the lint and debris loosened by the action of the beater bar is separated from the air flow within the cylindrical canister of centrifugal separator 15. However, some small debris or particulates, and in particular, those having a high lift-to-weight ratio, may pass through the centrifugal separator and into the pump/motor combination. This causes a long term problem with regard to maintenance of the pump/motor combination because a portion of this air flow is also used to cool the motor. According to the present invention, this problem is solved by provision of a filter plenum generally illustrated at 20 in FIG. 3. The filter plenum is disposed between the centrifugal separator 15 and the motor/pump combination 16. A means for filtering is disposed within the filter plenum for collecting lint and small debris from the air flowing into the motor/pump combination comprising a filter drawer or tray 22 having a large area, reuseable, flexible foam filter element 23 and a sheet filter element 24 disposed therein. The sheet filter element 24 may comprise a high efficiency particulate arrest (HEPA) filter or, in another preferred embodiment, may comprise a reuseable sheet of polypropylene filter material. Such filters are capable of filtering particulates from air flow as small as one micron in diameter. The filter tray 22 is slideably received within the filter plenum 20 and a handle is provided at 26 to facilitate the manual removal of the filter tray for replacement or cleaning of the filter elements contained therein.

Figure 4:
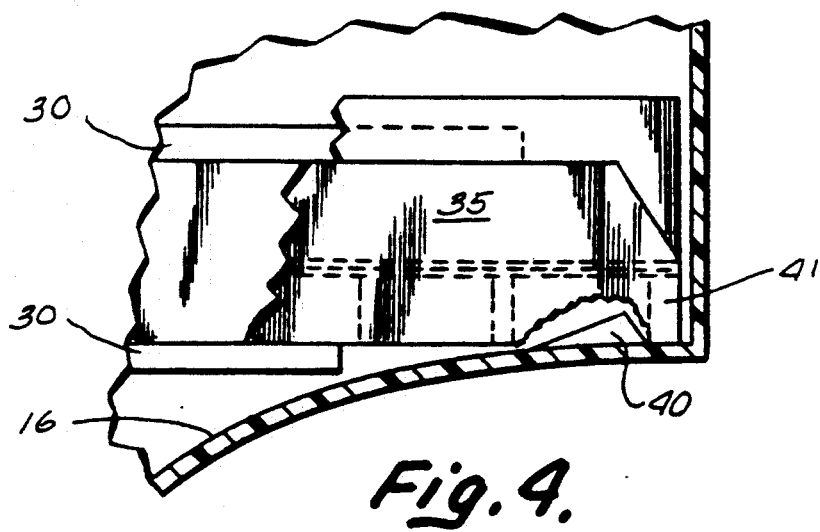
FIG. 4 is a fractional elevational view partially in section of a support structure for the filter tray of the present invention.
Figure 5:
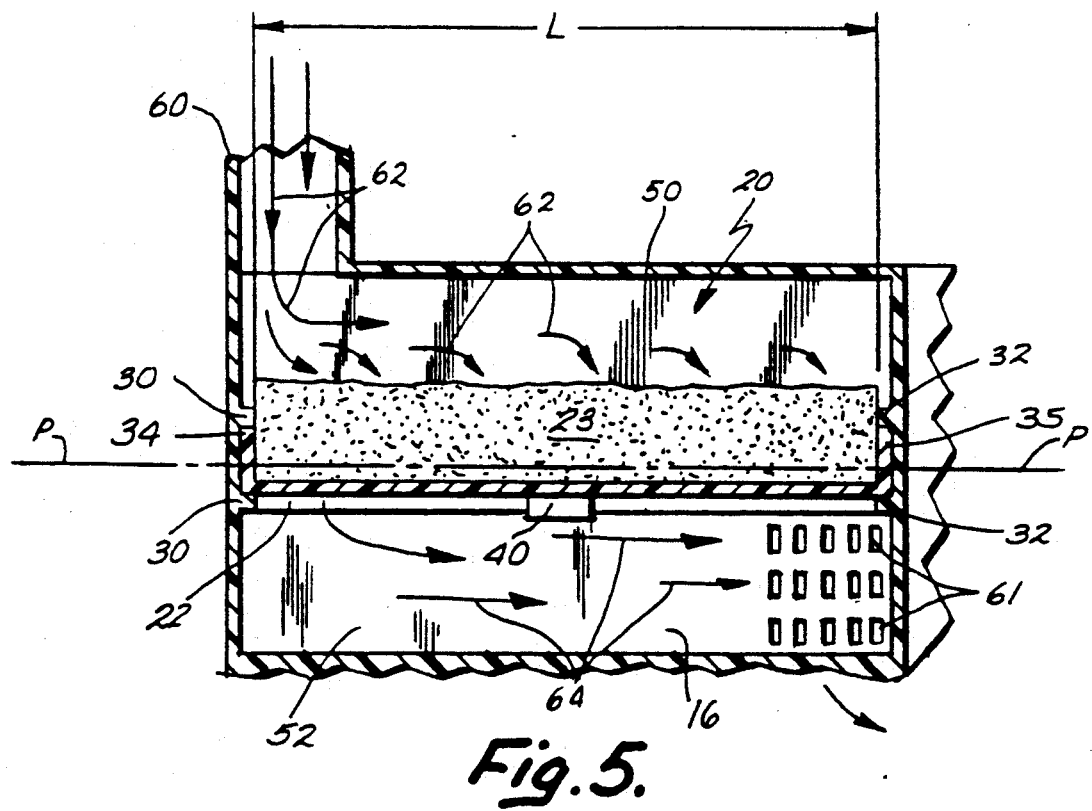
FIG. 5 is a fractional elevation view partially in section of the filter plenum of the present invention with the filter tray disposed therein.
Figure 8:
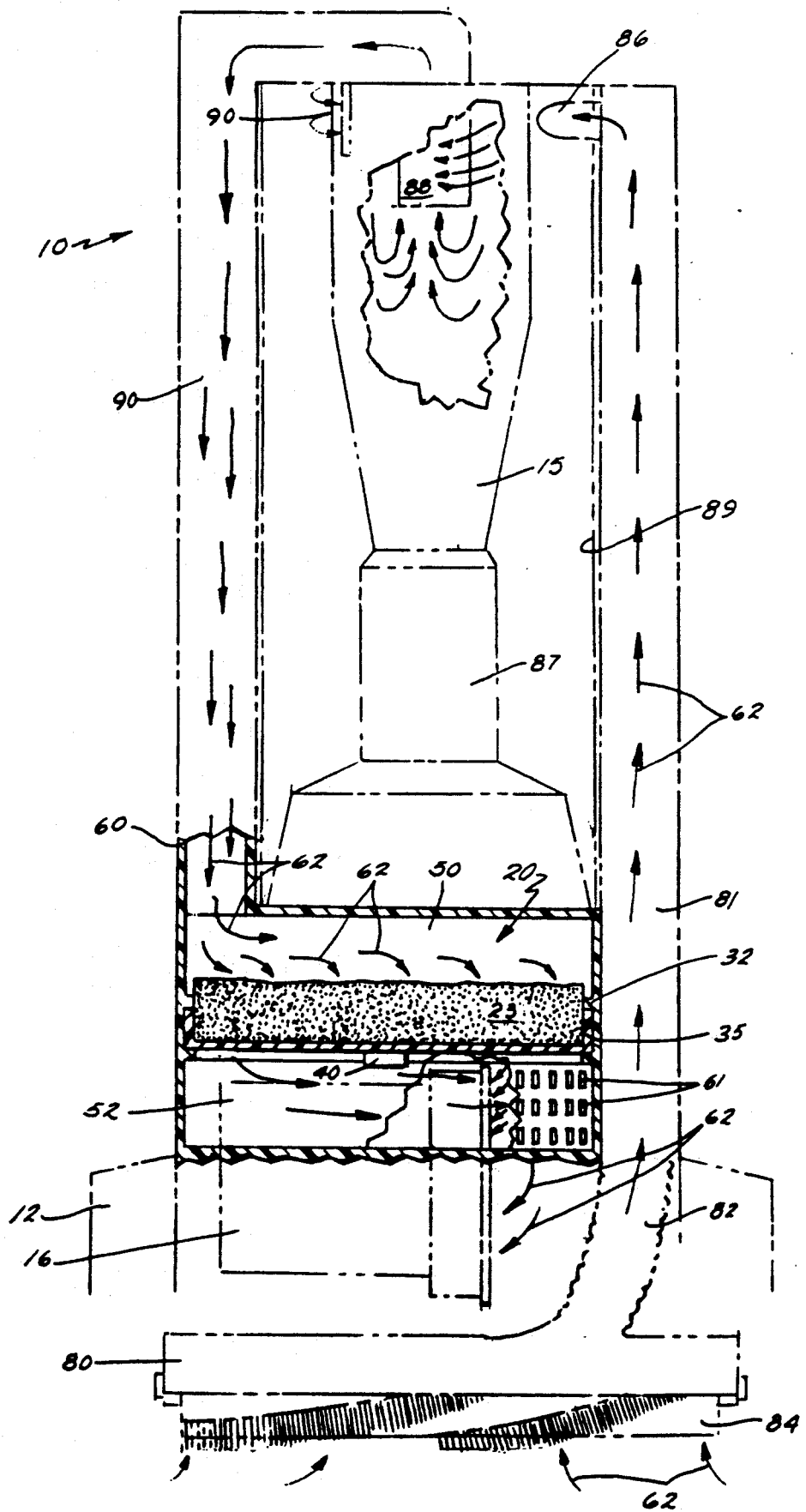
FIG. 8 is a fractional elevational view partially in section of an upright vacuum cleaner shown in phantom incorporating the final filter of the present invention showing the relationship of the present invention to the vacuum cleaner motor, pickup head, cyclone, the inlet and outlet to the cyclone and the means for supplying cooling air.

With particular reference now to FIGS. 4 and 5, the support structure disposed within the plenum 20 for the filter tray 22 is illustrated in further detail. The support structure comprises a pair of rails at 30 and 32 disposed on opposite sides of the filter plenum 20. The rails 30 and 32 slideably engage the sides 34 and 35 of the filter tray 22. As best illustrated in FIG. 3, the filter drawer 22 comprises a lattice structure 38 which extends between the sides 34 and 35 of the filter tray defining a support surface for the filter elements 23 and 24. A detent for engaging the slideable filter tray is provided comprising a cam surface 40 best illustrated in FIG. 4 which engages the front lip 41 of the lattice structure for snap locking the slideable filter tray within the filter plenum. With reference now also to FIGS. 3 and 6, it is illustrated that the filter tray 22 is provided with a peripheral flange 44 upon which is mounted an elastomeric seal 45. The flange 44 and seal 45 thus form an airtight closure for the filter plenum 20.

With particular reference now to FIGS. 3, 5 and 6, it is illustrated that the filter tray 22 and filter elements 23 and 24 are provided with an elongate shape which defines a major dimension L of the filter tray and filter elements. This major dimension L extends in a substantially horizontal plane P which bisects the filter plenum 20 creating inlet manifold 50 and outlet manifold 52. The inlet and outlet manifolds 50 and 52 extend in a generally horizontal direction parallel to the plane P. The inlets and outlets for these manifolds are disposed at opposite ends of the major dimension L of the filter tray to optimize the flow characteristics of the filter plenum. More particularly, an air inlet 60 is disposed on one end of the inlet manifold 50 for distributing air and small debris drawn from the centrifugal separator 15 onto the upper surface of the large area foam block filter 23. The arrows at 62 generally illustrate the direction of air flow within inlet manifold 50. Similarly, the outlet 61 for clean air directed to the motor/pump combination is disposed on the opposite end of the major dimension L of the filter tray 22. The arrows 64 generally illustrate the air flow within outlet manifold 52.

Figure 7:
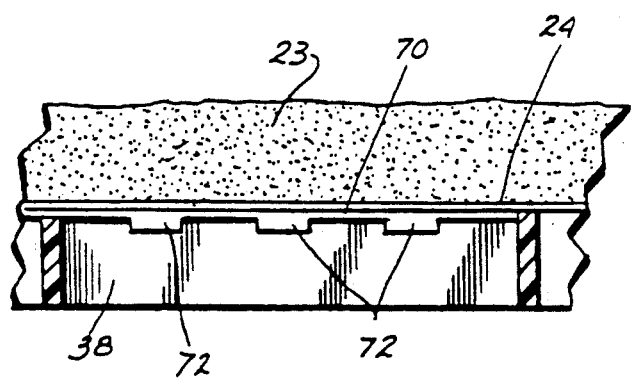
FIG. 7 is a fractional view partially in section of the lattice structure and support surface of the filter tray of the present invention with a foam block filter and sheet filter element disposed thereon.

With reference now to FIGS. 3 and 7, it is illustrated that the filter tray 22 comprises a lattice work 38 which defines a support surface 70, best illustrated in FIG. 7, for receiving large area foam block filter 23 and sheet filter element 24. As illustrated in FIG. 7, the lattice work 38 is provided with a plurality of reliefs or channels 72 disposed below the support surface 70 of the lattice 38 for balancing pressure on the low pressure or the downstream side of the filter elements 23 and 24.

The above description is exemplary and should be considered that of the preferred embodiment only. Modifications of the invention will occur to those who make and use the invention. It is desired to include such modifications within the scope of the invention and, thus, the proper scope of the invention should be determined with reference to the appended claims.

I claim:

1. In a vacuum cleaner for cleaning lint and debris from environmental surfaces, the combination comprising:
   a centrifugal separator;
   a pump for drawing air, lint and debris through said separator;
   a motor for driving said pump, said pump supplying cooling air for the motor;
   a filter plenum disposed between said separator and said pump for receiving air from said separator and delivering air to said pump; and
   a means for filtering disposed in said filter plenum for removing lint and small debris from the air drawn by said pump; and
   wherein said means for filtering comprises a filter tray, said filter tray having an elongate shape defining a major dimension of said filter tray which extends in a substantially horizontal plane within said plenum; and
   wherein said filter tray is provided with an elongate shape having a first end and a second end disposed on opposite sides of said horizontal plane; and an air inlet is provided for said inlet manifold, said air inlet being disposed adjacent said first end of said filter tray; and an air outlet is provided for said outlet manifold, said air outlet being disposed adjacent said second end of said filter tray.

2. The vacuum cleaner of claim 1 wherein said means for filtering comprises:
   a large area filter element disposed within said plenum for removing lint and small debris from the air drawn by said pump; and
   a sheet filter element for further removing small debris from the air drawn by said pump.

3. The vacuum cleaner of claim 2 wherein said area filter comprises an air-permeable, reusable, flexible foam block filter having an elongate shape defining a major dimension of said block filter which extends in a substantially horizontal plane within said plenum.

4. The vacuum cleaner of claim 3 wherein said sheet filter element comprises a sheet of air-permeable fibrous material, said sheet being disposed between said large area filter element and the pump.

5. The vacuum cleaner of claim 1, wherein said means for filtering comprises:
   a foam area filter;
   a sheet filter; and
   a filter tray for receiving said area filter and said sheet filter, said filter tray having an elongate shape defining a major dimension of said filter tray which extends in a substantially horizontal plane within said plenum.

6. The vacuum cleaner of claim 5, wherein said filter tray further comprises:
   a filter support surface having an area greater than or substantially equal to that of said area filter and said sheet filter to accommodate said filters therein, said filter support surface comprising a lattice structure disposed substantially parallel in relation to said major dimension of said filter plenum.

7. The vacuum cleaner of claim 6 wherein said lattice structure is provided with a plurality of reliefs disposed below said filter support surface for balancing air pressure below said filter support surface.

8. The vacuum cleaner of claim 6, wherein said filter tray further comprises a back side, said back side being provided with a peripheral flange; and an elastomeric seal disposed on said peripheral flange for sealing said filter tray within said plenum.

9. The vacuum cleaner of claim 8, wherein said back side further comprises a handle means for grasping and removing said filter tray and said filter means from said filter plenum.

10. The vacuum cleaner of claim 9 wherein said filter plenum further comprises a detent means for engaging said filter tray and retaining the same within said plenum.

11. The vacuum cleaner of claim 9 wherein said filter plenum further comprises a pair of rails disposed on opposite sides of said plenum for slideably engaging said filter tray.

12. The vacuum cleaner of claim 11 wherein said detent means comprises a cam disposed in said plenum for engaging said filter tray when said filter tray is slideably received by said rails.

13. The vacuum cleaner of claim 12 wherein said filter plenum further comprises support means for holding said filter tray in a substantially horizontal plane within said plenum and defining an inlet manifold disposed above said filter tray and an outlet manifold below said filter tray.

* * * * *